R. C. RASMUSSEN.
KNOCKDOWN CART.
APPLICATION FILED JULY 12, 1910.
995,566.
Patented June 20, 1911.
3 SHEETS—SHEET 1.
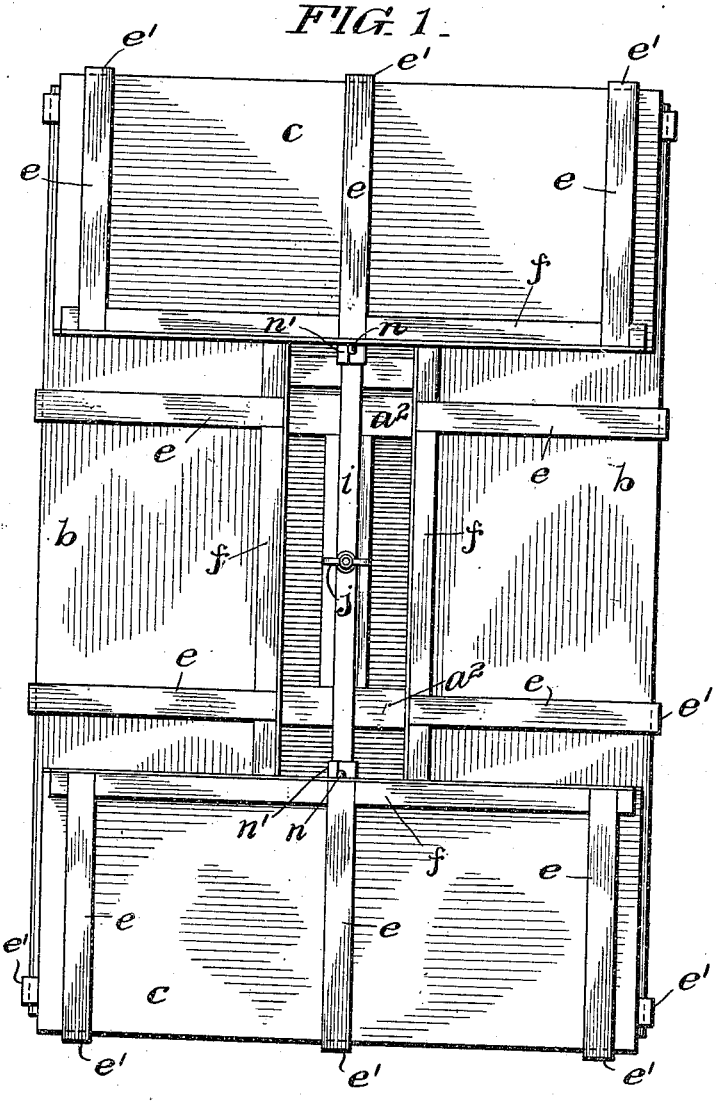
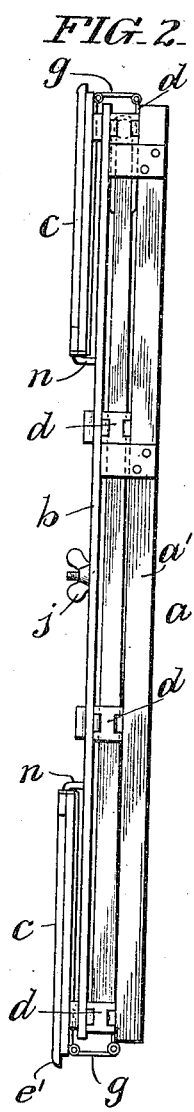
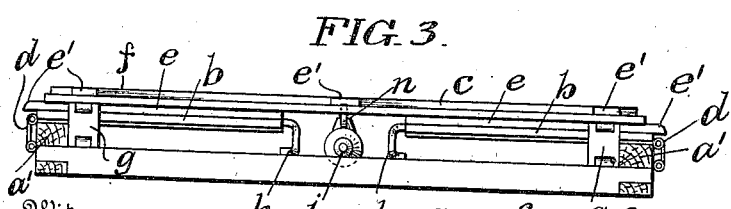
Witnesses
Daniel Webster, Jr.
E. H. Barlow
Inventor
Rudolph C. Rasmussen
By
Attorney

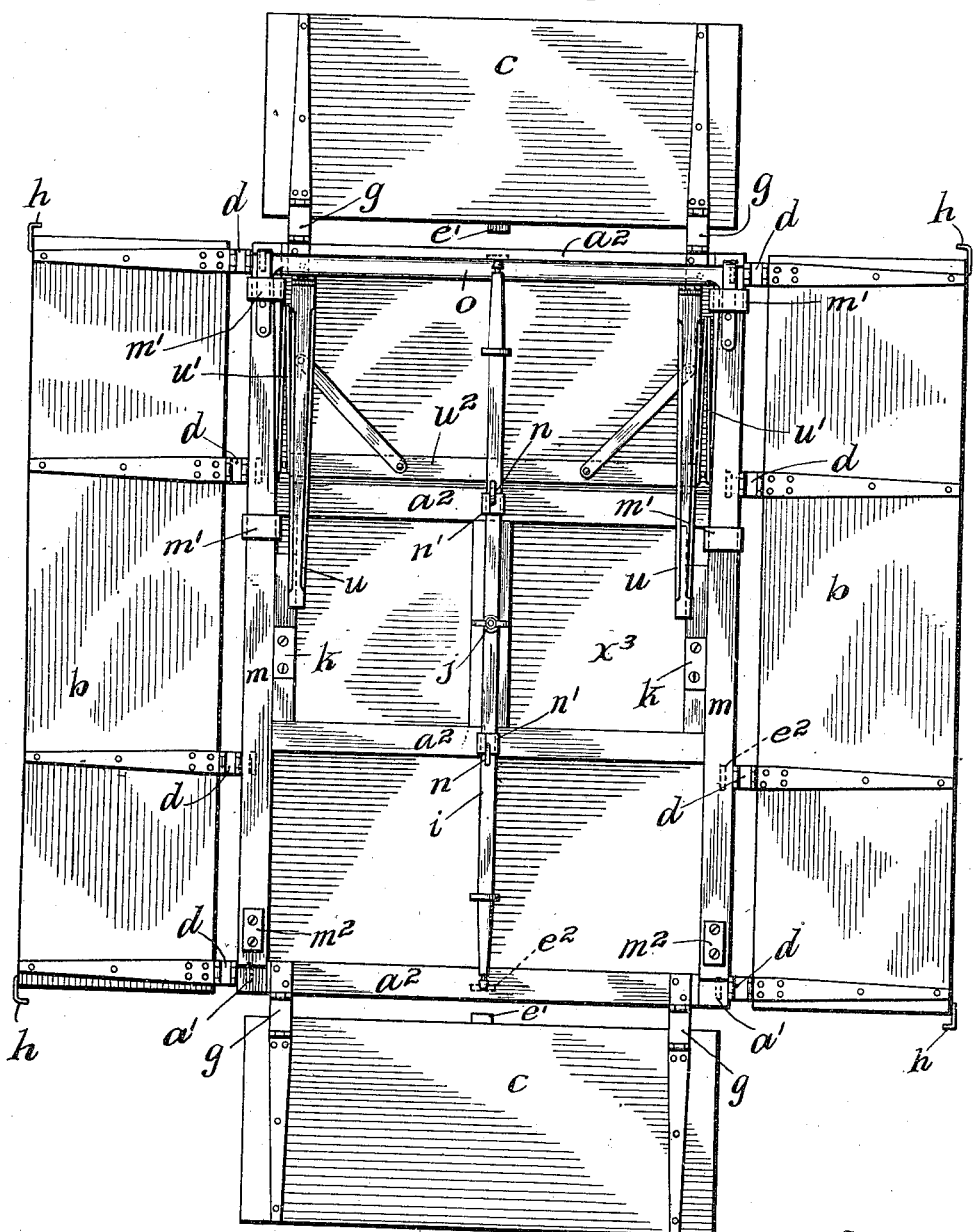

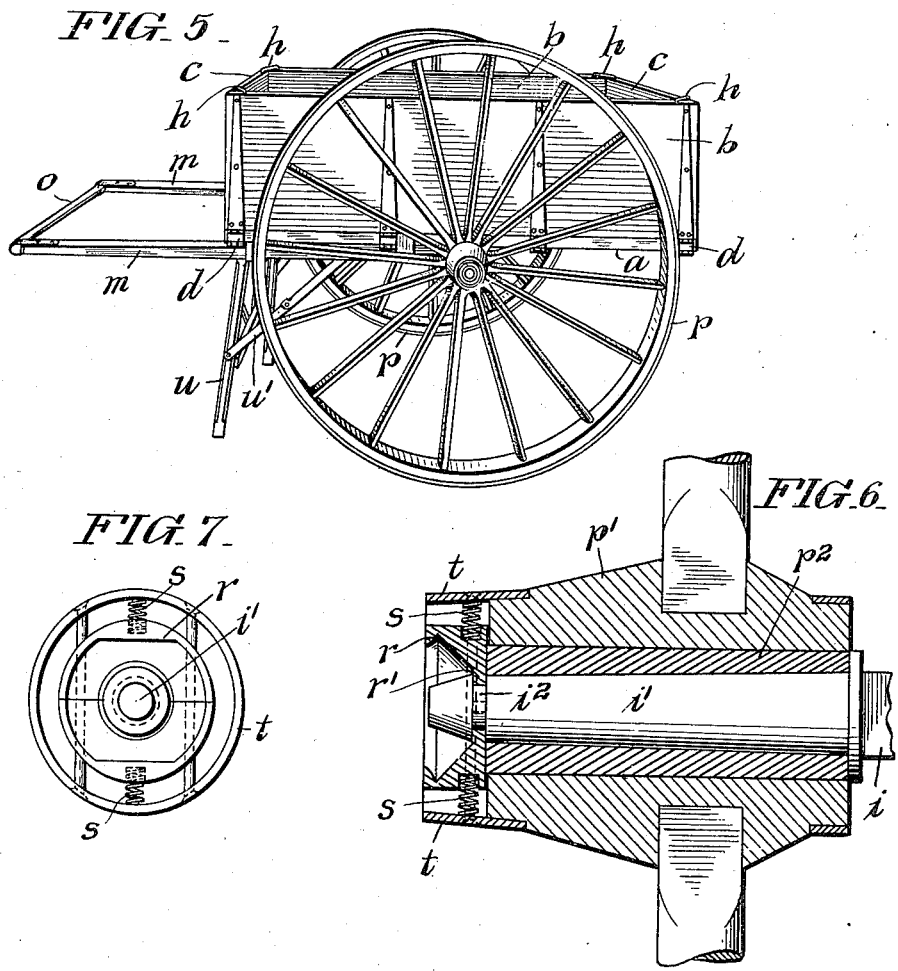

UNITED STATES PATENT OFFICE.

RUDOLPH C. RASMUSSEN, OF PHILADELPHIA, PENNSYLVANIA, ASSIGNOR TO PAUL J. DEVITT, OF PHILADELPHIA, PENNSYLVANIA.

KNOCKDOWN CART.

995,566.  Specification of Letters Patent.  Patented June 20, 1911.

Application filed July 12, 1910. Serial No. 571,596.

*To all whom it may concern:*

Be it known that I, RUDOLPH C. RASMUSSEN, a citizen of the United States, and a resident of the city and county of Philadelphia, State of Pennsylvania, have invented an Improvement in Knockdown Carts, of which the following is a specification.

It is the object of my invention to provide a knock-down cart, which, when collapsed, will occupy a minimum of space, and in which all of the parts, except the wheels, are permanently connected, so that none can become lost or mislaid, either when the cart is being knocked down, or while it is being transported.

In carrying out my invention I form the body of the cart of a bottom and side and end walls permanently hinged together, so that the side and end walls may be folded down upon the bottom when the cart is collapsed. The hinges are preferably double-jointed strap-hinges, and the side and end walls may be folded over on the back of the bottom.

The axle is pivotally connected with the bottom, so that it may be turned either into a longitudinal position when the cart is knocked down, or into a transverse position to carry the wheels when the cart is erected.

When a handle-bar is used it is carried by slides movable in guides on the bottom, so that it may be pushed under the bottom when the cart is knocked-down, or pulled out when the cart is erected. The axle acts as a stop to hold the handle-bar extended when the cart is erected.

The wheels, which are detachable from the other parts of the cart, are provided with spring clamps in the hubs which automatically lock the hubs upon the bearings of the axle when the wheels are pushed on, and enable the wheels to be removed when the cart is knocked-down.

My invention relates to various other improvements in construction and combinations of parts which are more fully set forth hereinafter.

In the drawings: Figure 1 is an inverted plan view of the cart-body when collapsed and folded; Fig. 2 is a side elevation of the same; Fig. 3 is an end elevation; Fig. 4 is an inverted plan view similar to Fig. 1 with the sides and end-boards unfolded; Fig. 5 is a perspective view of the cart when erected; Fig. 6 is a sectional view of the wheel-hub showing its connection with the axle; Fig. 7 is an end elevation of the wheel-hub; and Figs. 8, 9 and 10 are sectional views illustrating details.

The body of the cart consists of the floor $a$, sides $b\ b$ and ends $c\ c$. The sides and ends are hinged to the floor, so that they may be folded down upon the floor when the body is collapsed. As shown the floor is made up of the side sills $a'\ a'$, cross-bars $a^2, a^2, a^2, a^2$, and the floor-board or boards $a^3$. The sides $b\ b$ are hinged at their lower edges to the sills of the floor by double-jointed hinges $d$ which permit the sides to be folded over on the back of the floor as shown in Figs. 1, 2 and 3, or to be raised into an upright position with reference to the face of the floor as shown in Figs. 5 and 10. The ends $c\ c$ are similarly hinged at their lower edges to the end cross bars $a^2\ a^2$ of the floor by double-jointed hinges $g$. As shown the links of these hinges are longer than the links of the hinges $d$ of the sides, so that the ends may be folded back over the folded ends of the sides as shown in Figs. 1, 2 and 3 or may be erected in vertical position as shown in Figs. 5 and 10. The sides $b\ b$ and ends $c\ c$ are provided on the inner face with vertical studs $e$, the lower ends of which project slightly below the lower edge of the side or end, as shown at $e'$, and are adapted to enter sockets $e^2$ in the sills $a'\ a'$ and end cross bars $a^2, a^2$, as is illustrated in Fig. 10, when the sides and ends are erected. The sides and ends may be braced at the top by sills $f$. When the sides and ends are erected they are fastened together by hooks $h$. As shown the hooks are secured loosely at one end to the upper corners of the sides $b$ and their other ends are dropped into sockets $h'$ in end pieces $c$ (see Fig. 9).

$i$ is the axle which is pivoted at its middle to the bottom $a^3$ and may be turned into longitudinal position, as shown in Figs. 1 and 4, when the cart is collapsed, or into a transverse position, as in Fig. 5, when the cart is erected. $j$ is a clamp for securing the axle in either position. When the axle is turned transversely it rests at the front against stops $k\ k$ secured to the sills $a'$, and these together with the bearing surface of the sill are preferably faced with metal as shown in Fig. 8.

$o$ is a handle-bar carried by slides $m\ m$. These slides are guided on the sills $a'\ a'$ in suitable guides $m'$ $m'$ and are provided at their inner ends with stops $m^2$ which limit their outward movement. When the slides are pulled out, the axle is placed in transverse position between the inner ends of the slides and the stops $k$ as shown in Fig. 8. The axle thus acts to secure the slides and handle-bar in extended position.

$n$, $n$ are hooks carried in sliding collars $n'$ $n'$ on the axle $i$ adapted to engage the ends $c$ when folded and secure them in closed position.

For the purpose of detachably securing the wheels $p$ to the axle I employ a spring clamp in the hub. This is shown in Figs. 6 and 7. $p'$ is the wheel hub having the tubular sleeve $p^2$ adapted to fit the bearing $i$ of the axle. The end of the axle projects beyond the sleeve and is provided with an annular groove $i^2$. $r$ is a split ring fitting over the projecting extremity of the axle and having an internal annular flange $r'$ which is adapted to engage the annular groove $i^2$. Springs $s$ between the parts of the ring $r$ and the outer ring $t$ of the hub force the parts of the ring together to engage the axle by means of the flange $r'$ and groove $i^2$.

$u$ are folding legs which are hinged to the back of the bottom $a$ and are provided with the usual jointed links $u'$ and cross braces $u^2$.

I prefer to connect the axle with the bottom of the cart by a permanent connection, so that it need not be disconnected when the cart is knocked-down or when it is erected. Thus all of the parts of the cart except the wheels are permanently connected together and none can be lost or mislaid when the cart is being knocked down or while it is being transported.

When the cart is erected, the catches $n$, $n$, are released and the sides $b$ and ends $c$ are turned over into upright position with the projections $e'$ of the studs fitting in the sockets $e^2$ on the bottom; the corner hooks are then engaged with the sockets in the ends $c$, $c$; the handle bar is pulled out to the limit of extension permitted by the stops $m'$, $m^2$; the axle is unclamped and is turned and dropped into the sockets between the stops $k$ and the ends of the slides $m$ and is then again clamped by the nut $j$; and finally the wheels are slipped on the bearings of the axle when the flanges $r'$ of the members of the split ring snap into the grooves $n^2$ of the axle. When desired for use the legs $u$ are turned down. In knocking down the cart the operations are reversed.

There should be sufficient play of the axle on its pivot pin to enable it to be raised so as to pass over the slides $m$ and drop into the sockets between the ends of the slides and stops $k$; but I prefer to have the clamping nut permanently attached to the pin so that the axle may not become entirely detached.

What I claim is as follows:

1. In a knock-down cart, the combination of a bottom, side and end walls permanently hinged to the bottom and adapted to be folded over on the bottom when the cart is knocked-down, and an axle pivotally connected with the bottom and adapted to be turned into either a longitudinal or a transverse position.

2. In a knock-down cart, the combination of a bottom, side and end walls, and double-jointed hinges between the bottom and side and end walls whereby the side and end walls may be folded over on the back of the bottom when the cart is knocked-down.

3. In a knock-down cart, the combination of a bottom, and side and end walls permanently hinged to the bottom and adapted to be folded over on the back of the bottom when the cart is knocked-down and having projections on their lower edges, the bottom being provided with sockets on its upper face to receive the projections of the side and end walls when they are erected.

4. In a knock-down cart, the combination of a bottom, and side and end walls permanently hinged to the bottom and adapted to be folded over on the back of the bottom when the cart is knocked-down and having projections on their lower edges, the bottom being provided with sockets on its upper face to receive the projections of the side and end walls when they are erected, and links for connecting the side and end walls at their upper corners.

5. In a knock-down cart, the combination of a bottom, side and end walls permanently hinged to the bottom and adapted to be folded over on the back of the bottom when the cart is knocked-down, and studs carried by said side and end walls and projecting beyond their lower edges, the bottom being provided with sockets on its upper face to receive the projecting ends of the studs of the side and end walls when they are erected.

6. In a knock-down cart, the combination of a bottom, side and end walls permanently hinged to the bottom and adapted to be folded over on the bottom when the cart is knocked-down, an axle permanently connected with the bottom on a pivot and a clamp to clamp the axle in either longitudinal or transverse position.

7. In a knock-down cart, the combination of a bottom, side and end walls permanently hinged to the bottom and adapted to be folded over on the bottom when the cart is knocked-down, an axle pivotally connected with the bottom and adapted to be turned into either a longitudinal or a transverse position, and stops on the bottom to arrest and support the axle at the front when in transverse position.

8. In a knock-down cart, the combination of a bottom, side and end walls permanently hinged to the bottom and adapted to be folded on the back of the bottom when the cart is knocked-down, a handle-bar, and extensible slides carrying said handle bar and guided on the back of the bottom and covered by the sides when folded.

9. In a knock-down cart, the combination of a bottom, side and end walls permanently hinged to the bottom and adapted to be folded on the back of the bottom when the cart is knocked-down, a handle-bar, and extensible slides carrying said handle-bar and guided on the back of the bottom and covered by the sides when folded, and stops to limit the outward movement of said slides.

10. In a knock-down cart, the combination of a bottom, side and end walls permanently hinged to the bottom and adapted to be folded on the bottom when the cart is knocked-down, a handle-bar, extensible slides carrying said handle-bar and guided on the bottom, and an axle pivotally connected with the bottom and adapted to be turned into either a longitudinal or transverse position, and when moved into a transverse position lying back of the ends of the slides of the handle-bar and acting as a stop to maintain said slides and bar in extended position.

11. In a knock-down cart, the combination of a bottom, side and end walls permanently hinged to the bottom and adapted to be folded on the bottom when the cart is knocked-down, a handle-bar, extensible slides carrying said handle-bar and guided on the bottom, an axle pivotally connected with the bottom and adapted to be turned into either a longitudinal or transverse position, and when moved into a transverse position lying back of the ends of the slides of the handle-bar and acting as a stop to maintain said slides and bar in extended position, and stops on the bottom to arrest and support the axle at the front when in transverse position.

In testimony of which invention, I hereunto set my hand.

RUDOLPH C. RASMUSSEN.

Witnesses:
ERNEST HOWARD HUNTER,
R. M. KELLY.

---

Copies of this patent may be obtained for five cents each, by addressing the "Commissioner of Patents, Washington, D. C."